UNITED STATES PATENT OFFICE.

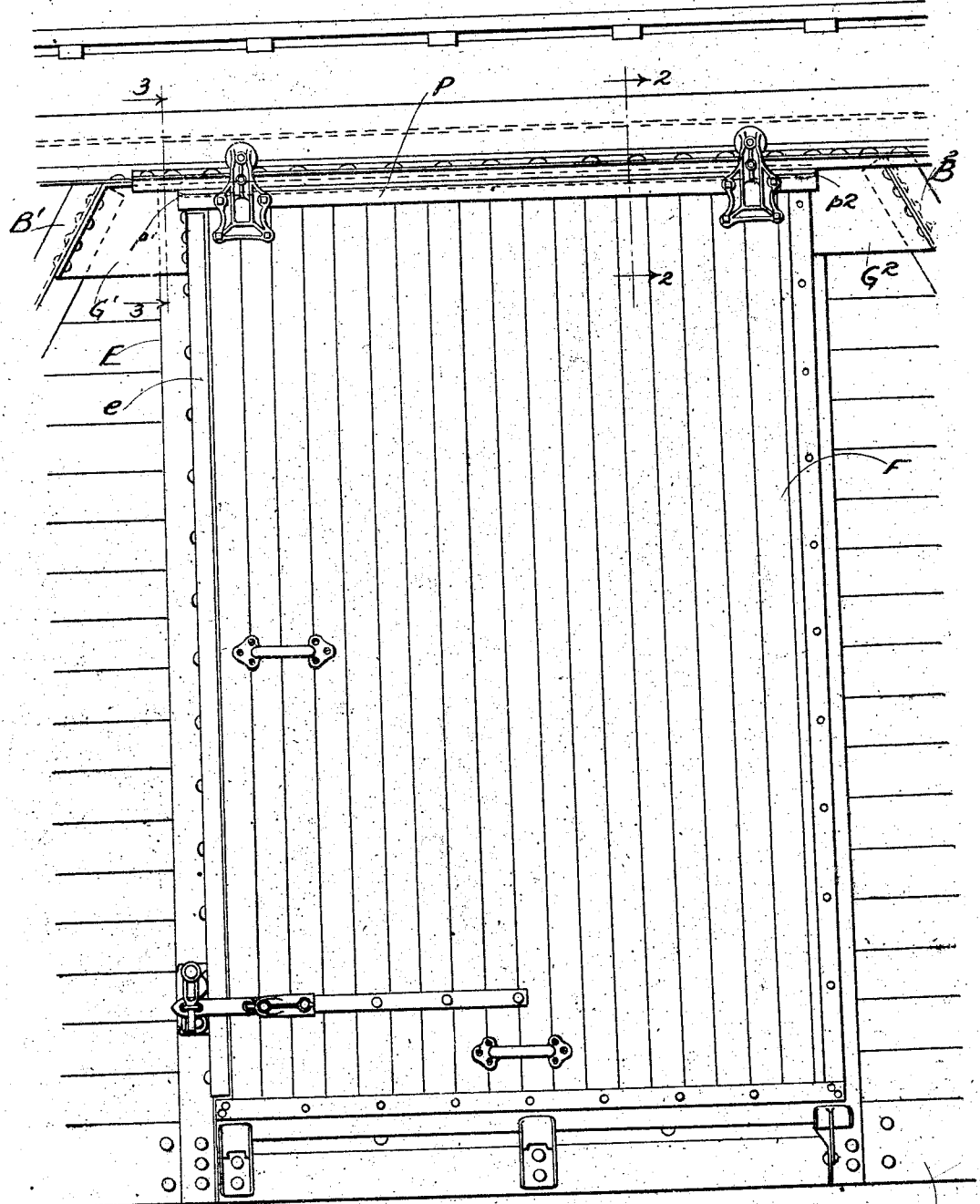

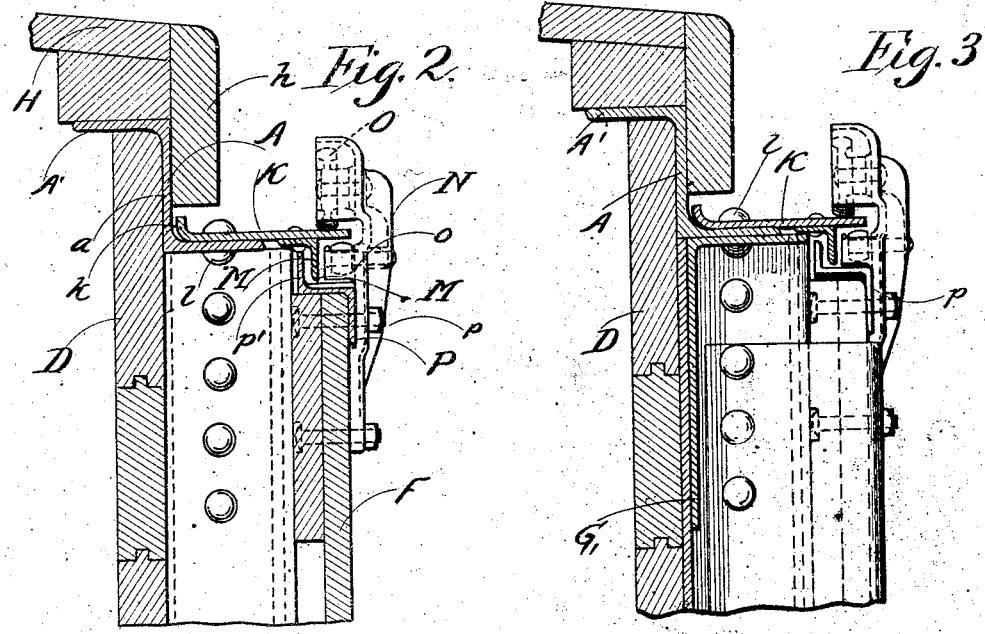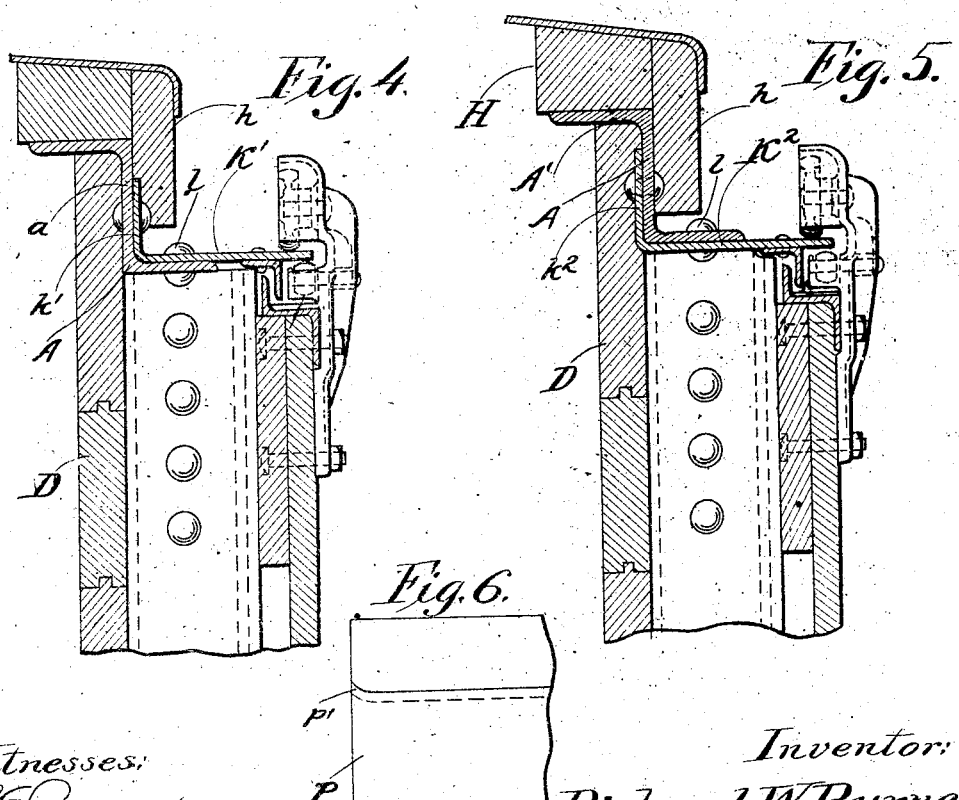

RICHARD WEBB BURNETT, OF MONTREAL, CANADA, ASSIGNOR TO CAMEL COMPANY, OF CHICAGO, ILLINOIS, A CORPORATION OF MAINE.

TRACK STRUCTURE FOR FREIGHT-CAR DOORS.

1,156,884.  Specification of Letters Patent.  Patented Oct. 19, 1915.

Application filed February 23, 1915. Serial No. 10,017.

*To all whom it may concern:*

Be it known that I, RICHARD WEBB BURNETT, a citizen of the United States, residing at Montreal, in the Dominion of Canada, have invented certain new and useful Improvements in Track Structure for Freight-Car Doors, of which the following is a specification.

My invention relates in general to freight cars, and more particularly to means for supporting the doors and for closing the space between the upper edges of the doors and the overlying support.

In freight cars of the construction having sides composed of metal beams forming trusses outside of the wooden sheathing, it is necessary that the path of movement of the sliding doors should be spaced outwardly from the wooden sides a distance equal to the thickness of the metal beams in order that the doors may slide out of the plane of the trussed beams. This arrangement requires that the track from which the door is suspended should project outwardly from the car sides a considerable distance, and owing to the consequent exposed position of the top of the door it is necessary that a thoroughly weather and dust proof joint should be provided between the upper edge of the door and the car side.

Considerable difficulty is experienced in providing tracks for supporting the sliding side doors of cars of the construction above referred to, which will prevent the ingress of water between the top of the door and overlying beam forming the upper chord of a trussed car side. The weight of the door is such as to subject the track to strains which tend to separate it from the supporting flange of the longitudinal beam to which the track is secured and to thereby permit ingress of water.

My invention has for its object to provide a track structure for supporting and guiding the doors of a freight car of the type above referred to, which will securely support and properly guide the door in its opening and closing movements, and which will afford a weather-proof closure for the space at the top of the door opening intermediate of the inner surface of the car door and the outer surface of the car side.

A further object of my invention is to provide means for supporting and guiding a sliding freight car door, and for forming a weather-proof joint between the door when closed and the door opening, which will be simple in construction, inexpensive to build, durable in use, and efficient in operation.

My invention will be more fully disclosed hereinafter with reference to the accompanying drawings, in which the same is illustrated as embodied in several convenient and practical forms, and in which;

Figure 1 is a side elevational view of a portion of a car side provided with my invention; Fig. 2 is an enlarged sectional view on line 2—2 of Fig. 1; Fig. 3 is an enlarged sectional view on line 3—3 of Fig. 1; Fig. 4 is a view similar to Fig. 2 showing a modified form of my invention; and Fig. 5 is a view similar to Fig. 2 showing still another modification.

Similar reference characters are used to designate similar parts in the several figures of the drawings.

Reference character A designates a Z-beam which extends along the top of the car side above the door opening therein, and forms the upper chord of the truss side frame.

B' and B² designate the upper ends of two of the upright Z-beams which are connected at their upper ends to the Z-beam A, and at their lower ends to the metal beam C extending along the bottom of the car side.

D indicates the wooden sheathing of the car side which is secured to the inner surfaces of the metal beams forming the truss of the car side.

E designates a vertical angle beam secured at its ends to the beams A and C and forming a stop for the car door F when it is closed. Secured to the outwardly projecting flange of the angle beam E is an angle beam *e*, one flange of which serves to overlap the front edge of the door when it is closed.

G' and G² designate gusset plates for securing the upper ends of the diagonal beams B' and B² to the Z-beam A.

H designates a portion of the car roof which is supported at its side upon the inwardly projecting horizontal flange A' of the Z-beam A.

*h* designates a weather strip secured to the side edge of the car roof and depending over the outer surface of the vertical web of the beam A.

The car construction above described does not in itself constitute my invention, as it is a type of freight car now well known to the art. It is, however, illustrated and described, inasmuch as my invention relates to providing such type of car with efficient door supporting and guiding mechanism.

K designates a horizontal plate overlying and secured to the outwardly projecting horizontal flange of the Z-beam A. The plate A extends across the top of the door opening and to one side thereof a sufficient distance to support the door in open position. The plate K is secured to the lower horizontal flange of the beam A by any suitable fastening devices such as rivets $l$. The inner edge of the plate K is bent upwardly, as indicated at $k$ so as to form a flange overlying the lower portion of the outer surface of the vertical web of the Z-beam A. The upwardly turned flange $k$ of plate K underlies the weather strip $h$ of the roof, and serves to catch any water which may flow toward the inner edge of the plate K, and prevent the same from passing between such plate and the underlying flange of the beam A and thence through the door opening into the car. The up-turned flange $k$ serves to direct any water falling upon the upper surface of the plate K away from the inner edge of such plate. In order to further prevent the passage of water between the upwardly curved flange $k$ of the plate K and the adjacent surface of the beam A, suitable packing material such as red lead or tar paper is inserted between such flange and the adjacent portion of the beam A.

Secured longitudinally along the under surface of the plate K intermediate of its outer edge and the outer edge of the underlying flange of the beam A, is an angle strip M, one flange of which depends over the top of the door opening. Suitable door hangers N are secured to the top of the door adjacent its front and rear edges, and engage the plate K. The door hangers are preferably provided with upper rollers O which overlie and rest upon the plate K adjacent its outer edge, and lower rollers $o$ which underlie the plate K, and are adapted to engage the under surface thereof in the opening and closing movements of the door.

P designates a Z-beam extending along the top of the door F and secured thereto by bolts $p$, passing through the downwardly extending flange of the beam P which overlaps the outer surface at the top of the door. The upwardly projecting flange $p'$ of the Z-beam P extends behind the depending flange of the angle bar M, as clearly shown in Fig. 2.

The Z-beam P along the top of the door preferably extends slightly beyond the front and rear edges of the door, as shown in Fig. 1, so as to terminate beyond the door opening. The ends of the horizontal web of the Z-beam P are bent upwardly, as indicated at $p'$ and $p^2$ so as to prevent any water flowing around the ends of the Z-beam, and hence protecting the door opening adjacent the front and rear edges of the door from the ingress of such water.

In Fig. 4 I have illustrated a modified form of my invention in which the plate which is engaged by the door hangers is provided with an upwardly extending portion overlying and secured to the outer surface of the vertical web of the beam A. In this figure of the drawing K' indicates such plate and $k'$ the upwardly projecting portion which overlies and is riveted to the vertical web $a$ of the Z-beam A. The upwardly projecting portion $k'$ of the said beam preferably extends behind the lower portion of the weather strip $h$ of the roof so as to afford a weather-proof joint to prevent the passage of water between the plate K' and the Z-beam A.

In Fig. 5 I have shown still another modified form of my invention in which $K^2$ designates the plate which supports the door guides. In this form of my invention the said plate extends beneath the horizontal lower flange of the beam and is riveted thereto. The inner edge of the plate $K^2$ is provided with an upwardly extending portion $k^2$ which laps and is riveted to the inner surface of the vertical web of the beam A.

From the foregoing description it will be observed that I have invented an improved door supporting structure for freight cars of the single sheath type, which will effectively prevent the leakage of water around the track supporting structure into the door opening.

What I claim is:

1. In a freight car, the combination with the side thereof having a door opening, of a track beam secured to the car side above the door opening and having a flange depending from the under surface thereof, a door controlling the door opening, hangers secured to the top of the door in sliding engagement with said track beam, an angle beam secured to the top of the door having a vertical flange extending behind the depending flange of the track beam, and a horizontal flange overlying the top of the door, the ends of the horizontal flange of said angle beam being turned upwardly to prevent water from flowing from the upper surface of said angle beam around the front and rear edges of the door.

2. In a freight car, the combination with the side thereof having a door opening, of a track beam secured to the car side above the door opening and having a flange depending from the under surface thereof, a door controlling the door opening, hangers secured to the top of the door in sliding engagement with said track beam, a Z-beam secured to the top of the door and projecting beyond the front and rear edges thereof, and having a vertical flange extending behind said depending flange of the track beam, the horizontal web of said Z-beam overlying the top of the door and having its ends turned upwardly to prevent water from flowing from said beam down the front and rear edges of the door opening.

In testimony whereof, I have subscribed my name.

RICHARD WEBB BURNETT.

Witnesses:
 P. M. ELLIOTT,
 W. W. DARROW.